F. O. BADGER.
TOASTER.

No. 177,786.

Patented May 23, 1876.

WITNESSES
M. P. Utley.
E. H. Bates

INVENTOR
Frank O. Badger
Gilmore, Smith & Co.
ATTORNEYS

UNITED STATES PATENT OFFICE.

FRANK O. BADGER, OF GREENPORT, NEW YORK.

IMPROVEMENT IN TOASTERS.

Specification forming part of Letters Patent No. 177,786, dated May 23, 1876; application filed May 6, 1876.

*To all whom it may concern:*

Be it known that I, FRANK O. BADGER, of Greenport, in the county of Suffolk and State of New York, have invented a new and valuable Improvement in Toasters; and I do hereby declare that the following is a full, clear, and exact description of the construction and operation of the same, reference being had to the annexed drawings, making a part of this specification, and to the letters and figures of reference marked thereon.

Figure 1:
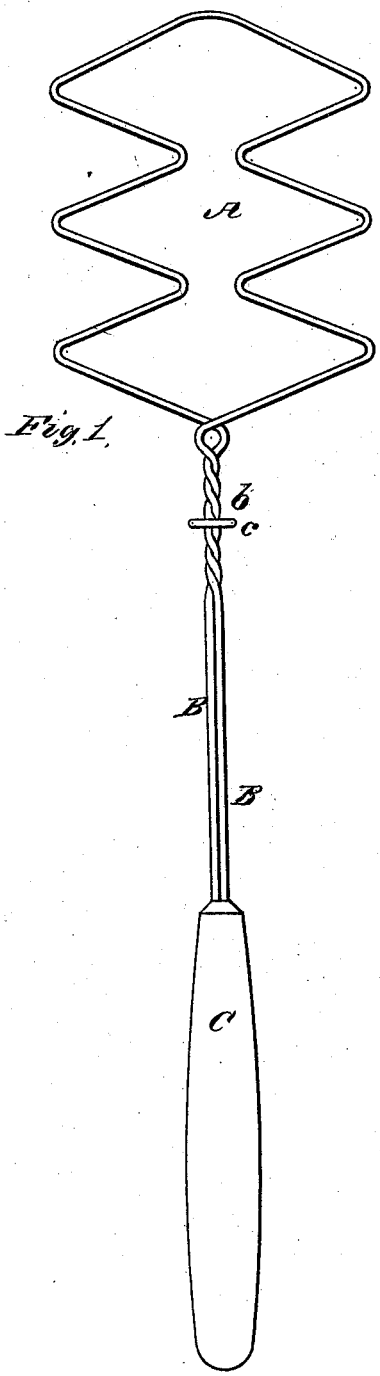
Figure 2:
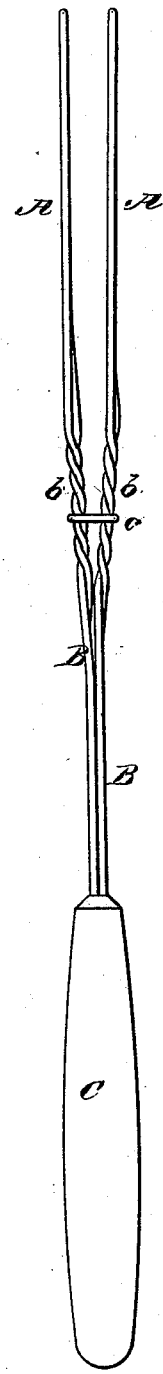

Figure 1 of the drawings is a representation of a plan view of my toaster, and Fig. 2 is an edge view of the same.

This invention has relation to bread toasters which are made of wire, and composed of two palms, formed on shanks secured into a handle, as will be hereinafter explained.

The nature of my invention consists in a bread-toaster having zigzag wire palms formed on shanks, part of which are twisted for receiving and retaining in place a closing-ring, as will be hereinafter explained.

I am aware that prior to my invention wire toasters have been made having skeleton palms formed on shanks provided with sliding closing-rings; but I believe that all such toasters are made with circular palms, which allow the slices of bread to warp while being toasted, and they have no provision for retaining the closing-rings positively in place on the shanks of the toaster. These objections are obviated by my improvement, as will be understood by the following description.

In the annexed drawings, A A designate the palms of the toaster; B B, the shanks thereof, and C the handle, into which the shanks are rigidly secured. Each palm and its shank I form of a single wire, bent as represented in Fig. 1—that is to say, each palm is formed with two zigzag or serpentine sides, connected at each end, as indicated, both ends being angular, and the intermediate angles being arranged directly opposite each other. I thus form a broad oblong palm, which will prevent the bread from sagging or curling up during the process of toasting it.

When the palm is formed the two straight portions of the wire which form the shank B are brought closely together, and united by twisting them at the point $b$. A ring, $c$, is then slipped on the shanks B, and the latter secured into the handle C. When a slice of bread is put between the two palms the ring $c$ is forced forward upon the twisted portions $b$, thus clamping the slice firmly.

The twisted portions $b$ of the shank B will hold the ring firmly in place when properly adjusted thereon.

What I claim as new, and desire to secure by Letters Patent, is—

As a new and improved article of manufacture, a bread-toaster of zigzag palms and shanks B B, twisted at $b$ $b$, in combination with the ring $c$, substantially as and for the purpose set forth.

In testimony that I claim the above I have hereunto subscribed my name in the presence of two witnesses.

FRANK OBADIAH BADGER.

Witnesses:
JOSEPH H. HARRIS,
CHARLES E. TUTHILL.